(12) United States Patent
Lee et al.

(10) Patent No.: US 9,244,549 B2
(45) Date of Patent: Jan. 26, 2016

(54) APPARATUS AND METHOD FOR USER INPUT

(71) Applicant: SAMSUNG ELECTRONICS CO., LTD., Suwon (KR)

(72) Inventors: Bhoram Lee, Seongnam (KR); Joonah Park, Hwaseong (KR); Hyun Jeong Lee, Hwaseong (KR); Soo Chul Lim, Seoul (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 13/895,649

(22) Filed: May 16, 2013

(65) Prior Publication Data

US 2014/0002390 A1    Jan. 2, 2014

(30) Foreign Application Priority Data

Jun. 28, 2012 (KR) .................. 10-2012-0070287
Dec. 31, 2012 (KR) .................. 10-2012-0157834

(51) Int. Cl.
| | | |
|---|---|---|
| G06F 3/041 | (2006.01) | |
| G06F 3/01 | (2006.01) | |
| G06F 3/043 | (2006.01) | |
| G06F 3/0481 | (2013.01) | |

(52) U.S. Cl.
CPC ............... *G06F 3/041* (2013.01); *G06F 3/016* (2013.01); *G06F 3/017* (2013.01); *G06F 3/0414* (2013.01); *G06F 3/0436* (2013.01); *G06F 3/04815* (2013.01)

(58) Field of Classification Search
None
See application file for complete search history.

(56) References Cited

U.S. PATENT DOCUMENTS

| 2008/0106517 | A1* | 5/2008 | Kerr et al. ................... 345/158 |
| 2010/0095249 | A1* | 4/2010 | Yoshikawa et al. ........... 715/856 |
| 2012/0258800 | A1* | 10/2012 | Mikhailov .................... 463/37 |
| 2012/0299857 | A1* | 11/2012 | Grant et al. .................. 345/173 |
| 2013/0099903 | A1* | 4/2013 | Yu et al. ..................... 340/12.22 |

FOREIGN PATENT DOCUMENTS

| JP | 05-216580 | 8/1993 |
| JP | 2003-288173 | 10/2003 |
| KR | 10-2009-0125447 | 12/2009 |
| KR | 10-1073062 | 10/2011 |

* cited by examiner

*Primary Examiner* — Nicholas Lee
(74) *Attorney, Agent, or Firm* — NSIP Law

(57) ABSTRACT

A user input apparatus and method may measure, using a first sensor, surface input information that is applied to a surface of a user input apparatus, may measure, using a second sensor, orientation information that is input based on a physical quantity associated with a pose or a rotary motion of the user input apparatus, and may generate a content control signal by combining the surface input information and the orientation information.

7 Claims, 16 Drawing Sheets

APPARATUS AND METHOD FOR USER INPUT

CROSS-REFERENCE TO RELATED APPLICATIONS

This application claims the priority benefit of Korean Patent Application No. 10-2012-0070287, filed on Jun. 28, 2012, and Korean Patent Application No. 10-2012-0157834, filed on Dec. 31, 2012, in the Korean Intellectual Property Office, the disclosures of which are incorporated herein by reference.

BACKGROUND

1. Field

The following description relates to a user input apparatus and method.

2. Description of the Related Art

Compared to a method of controlling two-dimensional (2D) content, a method of controlling three-dimensional (3D) content may require an input of high degree-of-freedom (DOF). Thus, the 3D content controlling method may need to generate a content control signal for controlling the 3D content by modifying an existing input channel using method or to diversify an input channel. For example, a method of adding a function for a 3D virtual space using an input device such as a keyboard, a joystick, a button, and the like, and using the added function as an input, a method of using, as an input, kinematic and action information of a user on a real 3D space, or a method of measuring a distance when a hand of a user contacts on an input device and then moves, a force applied to the input device, or a displacement occurring due to the applied force, and using a measured value as an input may be employed.

In the case of using kinematic and action information of a user on the 3D space, an input method of projecting, onto a 2D screen, a motion of the user in a spatial mouse form or the 3D space may be employed. The above method may need to use another input channel for inputting three directions. In the case of a mapping method on the 2D screen, a physical space to be mapped is constrained and thus, a motion of an input device and the user may be unsuitable for interaction.

SUMMARY

According to an aspect of one or more embodiments, user input apparatus may include a first sensor to measure surface input information that is applied to a surface of the user input apparatus; a second sensor to measure orientation information that is input based on a physical quantity associated with a pose or a rotary motion of the user input apparatus; and a signal processing unit to generate a content control signal by combining the surface input information and the orientation information.

The surface input information may include vertical information about a contact surface of the user input apparatus or horizontal information about the contact surface.

The orientation information may include a computed value from at least one of a magnetic field, a tilt angle, an angular velocity, an azimuth, gravity, and an acceleration.

The signal processing unit may select a plane on a three-dimensional (3D) space of content from the orientation information, and may generate new information in the 3D space by projecting the surface input information onto the selected plane.

The signal processing unit may change an attribute associated with a translation or a rotation of the content using the selected plane and the new information in the 3D space.

The user input apparatus may further include a display unit to display content based on the content control signal.

The user input apparatus may further include a feedback implementation unit to provide a feedback to a user to indicate a change in content by the content control signal.

The feedback may include at least one of an audio feedback, a haptic feedback, and a visual feedback.

In the case of implementing the haptic feedback, the feedback implementation unit may include at least one of a force transferring unit to transfer a force to the user input apparatus, a tactile display unit to express a pressure distribution on the user input apparatus, at least one vibrating unit to vibrate the user input apparatus, and a stimulus transferring unit to provide the user with a stimulus by tactile feedback.

The stimulus transferring unit may transfer at least one of a stimulus using an electrostatic force, a cold temperature stimulus or a warm temperature stimulus using a temperature difference, a stimulus using an air suction or exhaustion force, and a stimulus using an electrode contact.

According to an aspect of one or more embodiments, a user input apparatus may include a first sensor to measure force information that is applied to an input surface of the user input apparatus; a second sensor to measure orientation information that is input based on a physical quantity of a pose or a rotary motion of the user input apparatus; and a signal processing unit to generate a content control signal by combining the force information and the orientation information.

The user input apparatus may further include a detector to detect a position of a point of action of force at which the force information is input.

According to an aspect of one or more embodiments, a user input apparatus may include a first sensor to measure contact information about a user contact on an input surface of the user input apparatus; a second sensor to measure orientation information that is input based on a physical quantity associated with a pose or a rotary motion of the user input apparatus; and a signal processing unit to generate a content control signal by combining the contact information and the orientation information.

According to an aspect of one or more embodiments, a user input apparatus may include a first sensor to measure direction input information; a second sensor to measure orientation information that is input based on a physical quantity associated with a pose or a rotary motion of the user input apparatus; and a signal processing unit to generate a content control signal by combining the direction input information and the orientation information.

According to an aspect of one or more embodiments, a user input method may include measuring, using a first sensor, surface input information that is applied to a surface of a user input apparatus; measuring, using a second sensor, orientation information that is input based on a physical quantity associated with a pose or a rotary motion of the user input apparatus; and generating a content control signal by combining the surface input information and the orientation information.

According to an aspect of one or more embodiments, a user input method may include measuring, using a first sensor, force information that is applied to an input surface of a user input apparatus; measuring, using a second sensor, orientation information that is input based on a physical quantity of a pose or a rotary motion of the user input apparatus; and generating a content control signal by combining the force information and the orientation information.

According to an aspect of one or more embodiments, a user input method may include measuring, using a first sensor, contact information about a user contact on an input surface of a user input apparatus; measuring, using a second sensor, orientation information that is input based on a physical quantity associated with a pose or a rotary motion of the user input apparatus; and generating a content control signal by combining the contact information and the orientation information.

According to an aspect of one or more embodiments, a user input method may include measuring, using a first sensor, direction input information; measuring, using a second sensor, orientation information that is input based on a physical quantity associated with a pose or a rotary motion of a user input apparatus; and generating a content control signal by combining the direction input information and the orientation information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
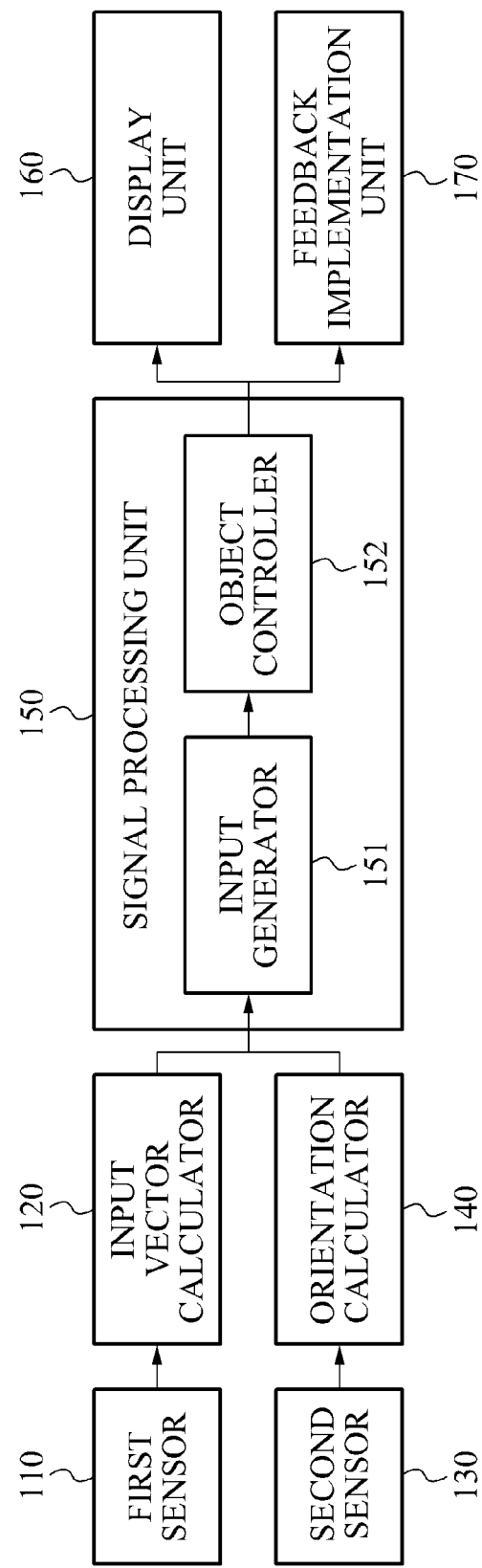
FIG. 1 illustrates a configuration of a user input apparatus according to an embodiment.

Reference will now be made in detail to embodiments, examples of which are illustrated in the accompanying drawings, wherein like reference numerals refer to like elements throughout. Embodiments are described below to explain the present disclosure by referring to the figures.

Terminologies used herein are defined to appropriately describe the embodiments and thus, may be changed depending on a user, the intent of an operator, or a custom. Accordingly, the terminologies must be defined based on the following overall description of the embodiments.

A user input apparatus according to an embodiment may receive two inputs, such as a surface input applied by a user and an orientation input of the user input apparatus, for example, and may generate a content control signal capable of controlling content based on the above two inputs.

FIG. 1 illustrates a configuration of a user input apparatus according to an embodiment.

Referring to FIG. 1, the user input apparatus may include a first sensor 110 to measure surface input information that is applied to a surface of the user input apparatus, a second sensor 130 to measure orientation information that is input based on a physical quantity associated with a pose or a rotary motion of the user input apparatus, and a signal processing unit 150 to generate a content control signal by combining the surface input information and the orientation information. However, the disclosure is not limited to the above. For example, the first sensor and the second sensor may be integrated into a single sensor to measure both surface input information and orientation information.

The user input apparatus may measure the surface input information and the orientation information, and may generate a content control signal by processing at least one of the measured surface input information and orientation information as input information. The user input apparatus may control and display content or an object using the content control signal.

The surface input information may include at least one of vertical information about a contact surface of the user input apparatus and horizontal information about a level of pushing applied to the contact surface. The orientation information may include a variety of information including at least one of a magnetic field, a tilt angle, angular velocity, an azimuth, gravity, and acceleration.

The user input apparatus may further include an input vector calculator 120. The input vector calculator 120 may process the surface input information in a form that may be used as input information.

Based on a sensor type and a degree of freedom (DOF), the second sensor 130 may calculate a tilt angle with respect to the gravity, an angular velocity, an azimuth with respect to the magnetic north, and a relative pose with respect to a predetermined reference, for example. The second sensor 130 may express the orientation information using at least one of Euler angles such as roll, pitch, and yaw, for example. The second sensor 130 may also express the orientation information in a matrix form such as a pan, a tilt, a quaternion, a directional cosine matrix (DCM), for example. The second sensor 130 may also express the orientation information using a gesture measurement value of tapping, shaking, and the like.

The user input apparatus may further include an orientation calculator 140. The orientation calculator 140 may process the orientation information in a form that may be used as input information.

The signal processing unit 150 may select a plane on a three-dimensional (3D) space of content from the orientation information, and may generate new information in the 3D space by projecting the surface input information onto the selected plane.

The first sensor 110 and the second sensor 130 of the user input apparatus may be located on a device that the user carries or uses. The signal processing unit 150 may be located within the user input apparatus or may be configured as a separate unit. When the signal processing unit 150 is configured as the separate unit, the user input apparatus may include a module for wireless communication (not shown) and a module for power supply (not shown) in order to process information.

The signal processing unit 150 may change an attribute associated with a translation or a rotation of the content using the selected plane and the new information in the 3D space. The signal processing unit 150 may include an input generator 151 and an object controller 152.

The input generator 151 may generate a final input by inputting, as input values, a direction of force and an apparatus orientation that are calculated and received from the input vector calculator 120 and the orientation calculator 140, respectively. The object controller 152 may generate a content control signal for controlling the content based on the generated final input.

The user input apparatus may further include a display unit 160 to display the content based on the content control signal. The display unit 160 may be configured to be combined with the user input apparatus. The display unit 160 may be provided as a separate module with a size at which a user may readily use the content, and may also be provided as a stand-alone device.

The user input apparatus may further include a feedback implementation unit 170 to provide a feedback to a user to indicate a change in the content by the content control signal. Using the feedback implementation unit 170, the user input apparatus may transfer a feedback to the user to be suitable for the changed content or target.

Depending on embodiments, the feedback implementation unit 170 may provide the user with a variety of feedbacks, such as an audio feedback, a haptic feedback, and a visual feedback, for example.

For example, even though not illustrated, in the case of implementing the haptic feedback, the feedback implementation unit 170 may include at least one of a force transferring unit, a tactile display unit, and at least one vibrating unit, and a stimulus transferring unit. The force transferring unit may transfer a force to the user input apparatus, the tactile display unit may express a pressure distribution, and the at least one vibrating unit may physically vibrate the user input apparatus. The stimulus transferring unit may provide the user with a stimulus by tactile feedback. The stimulus transferring unit may transfer at least one of a stimulus using an electrostatic force, a cold temperature stimulus or a warm temperature stimulus using a temperature difference, a stimulus using an air suction or exhaustion force, and a stimulus using an electrode contact.

Depending on embodiments, the user input apparatus may include the first sensor 110 to sense an input by a hand on a user contact portion, the second sensor 130 to sense orientation information associated with a pose of the user input apparatus, and the signal processing unit 150 to generate a content control signal by combining force information and orientation information.

The user input apparatus may measure, using the first sensor 110, force information that is applied to an input surface of the user input apparatus, and may measure, using the second sensor 130, orientation information that is input based on a physical quantity of a pose or a rotary motion of the user input apparatus. Using the signal processing unit 150, the user input apparatus may generate a content control signal by combining the force information and the orientation information.

The user input apparatus may further include a detector (not shown) to detect a position of a point of action of force at which the force information is input.

The signal processing unit 150 may select a plane on a 3D space of content from the orientation information, and may generate new information in a 3D space by projecting the force information onto the selected plane. The signal processing unit 150 may change an attribute associated with a translation or a rotation of the content using the selected plane and the 3D space information.

Figure 2:
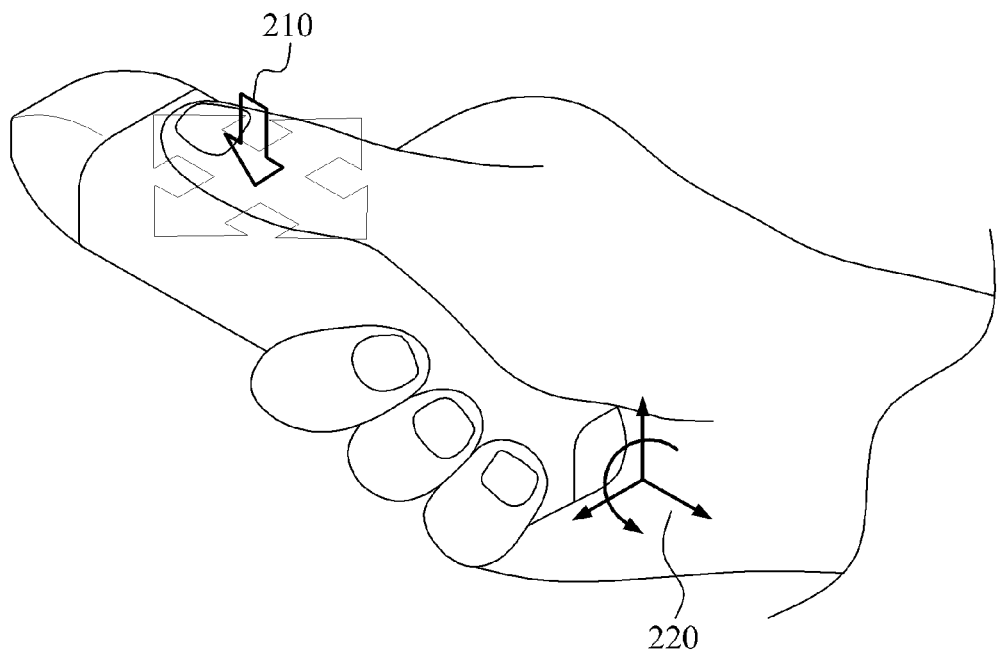
FIG. 2 illustrates an example of a user input apparatus using a force according to an embodiment.

FIG. 2 illustrates an example of a user input apparatus using a force according to an embodiment.

Referring to FIG. 2, a first sensor 210 of the user input apparatus is a sensor capable of measuring force information and using the measured force information as input information. Any type of sensors of which states vary due to the force applied to the user input apparatus may be employed as the first sensor 210.

For example, the first sensor 210 may include any sensor of which physical states, such as resistance, capacitance, voltage, magnetic field, optical wavelength, density, temperature, length, and volume, for example, vary, and capable of measuring a value of a varying physical state.

Also, the first sensor 210 may include an elastic layer to easily transfer a force around the first sensor 210, or may be a sensor made of an elastic material. Also, the first sensor 210 may be coated with an elastic material, and thus, may have durability.

Depending on embodiments, the number of first sensors 210 and arrangement thereof may be diversified. For example, at least one first sensor 210 may be consecutively or inconsecutively configured. Here, the first sensor 210 may include a base to support the first sensor 210 from force that is applied to a contact portion.

Hereinafter, a method of measuring force information will be described based on the assumption that a force sensor is used as a first sensor of a user input apparatus according to an embodiment.

As described above, the user input apparatus may be variously embodied based on the number of force sensors corresponding to a first sensor and arrangement thereof, and a type of a second sensor and a DOF thereof.

A force sensor that is a first sensor may calculate information about a point of action of force, a direction of force, magnitude of force, and duration of time in which the force is applied, for example, based on a configuration of the user input apparatus, the number of user input apparatuses, and the arrangement thereof.

The force sensor may calculate the direction of force from an output of the force sensor and directly use a calculated value, or may classify the direction of force as a predetermined direction based on the calculated value. For example, the force sensor may express the direction of force using a unit such as a degree or a radian, and may classify the direction of force into one of up/down/left/right, 4 compass bearings, 8 compass bearings, and 12-hour expression, and thereby express the direction of force. The force sensor may express the direction of force as a 3D direction based on force that is vertically applied.

The force sensor may calculate the magnitude of force from the output of the force sensor and directly use a calculated value, or may express the magnitude of force using a predetermined magnitude level. For example, the force sensor may express the magnitude of force using a physical unit such as voltage, a Newton (N), and PSI, for example, and may also express the magnitude of force using a relative level such as high/low, strong/medium/weak, and levels 1 to 5, for example.

The force sensor may calculate, from the output of the force sensor, duration of time in which the force is maintained, and directly use a calculated value, or may express the duration of time as a predetermined magnitude level using the calculated value. For example, the force sensor may express the duration of time using a physical unit indicating a time such as a second, for example, and may also express the duration of time using a relative level such as short/long and levels 1 to 3, for example. The force sensor may calculate the duration of time from the output of the force sensor and may define and use an input of force of consecutive sequence.

The user input apparatus may include a second sensor 220 to measure orientation information that is input based on a physical quantity of a pose or a rotary motion of the user input apparatus. The second sensor 220 may sense orientation information associated with the pose. The second sensor 220 may measure the physical quantity associated with the pose or the rotary motion state of the user input apparatus using at least one of an accelerometer, an angular velocity detector, a tilt sensor, a magnetic field sensor, an azimuth sensor, and a gravity sensor.

The user input apparatus may generate a content control signal by combining the force information and the orientation information.

Figure 3:
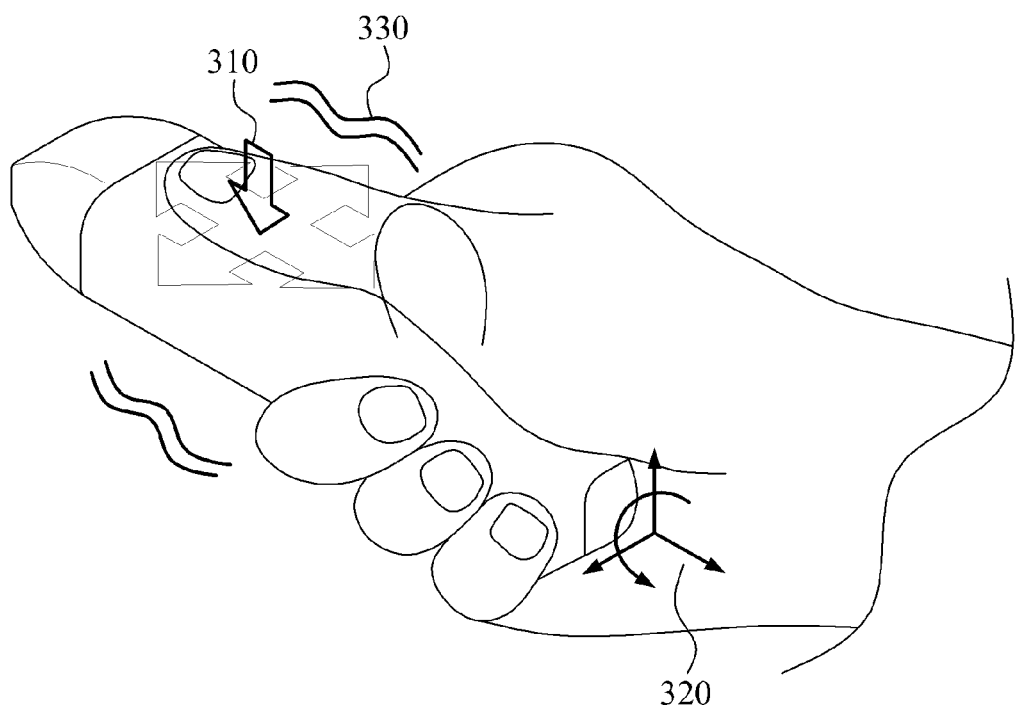
FIG. 3 illustrates an example of a haptic feedback function applied to a user input apparatus according to an embodiment.

FIG. 3 illustrates an example of a haptic feedback function applied to a user input apparatus according to an embodiment.

The user input apparatus may generate a content control signal by using, as input information, force information and orientation information that is measured using a first sensor 310 and a second sensor 320, respectively. The user input apparatus may control content based on the generated content control signal. The user input apparatus may include a feedback implementation unit to provide a user with a change in the content that occurs according to control of the content.

The user input apparatus may provide the user with at least one of an audio feedback, a haptic feedback, and a visual feedback. As illustrated in FIG. 3, the user input apparatus may provide the user with a haptic feedback 330. The user input apparatus may include a vibrating motor to provide the user with the haptic feedback 330.

The user input apparatus may include a speaker to provide the user with an audio feedback, and may include a display module for providing visual information to provide a visual feedback.

Depending on embodiments, the user input apparatus may include a feedback implementation unit to provide at least one haptic feedback of a stimulus using an electrostatic force, a cold temperature stimulus or a warm temperature stimulus using a temperature difference, a stimulus using an air suction or exhaustion force, and a stimulus using an electrode contact.

As an example, the user input apparatus may include an electrostatic force actuator, and may provide the user with a tactile feedback in a portion in which a force of the user input apparatus is input, using the electrostatic force actuator. Using the electrostatic force actuator mounted to a portion in which force of the user input apparatus is input or applied, the user input apparatus may provide the user with a sensation of a button click or a sensation of friction at a moment when a force input occurs.

As another example, the user input apparatus may include a Peltier heat pump, and may provide the user with a tactile feedback about cold/warm temperature using the Peltier heat pump. In this example, the user input apparatus may provide the user with the cold/warm temperature according to content control of the user by including a hardware module such as the Peltier heat pump, for example, but is not limited to the hardware module such as the Peltier heat pump. Therefore, the user input apparatus may include a variety of devices to provide the cold/warm temperature.

The user input apparatus may include the first sensor 110 to measure contact information about a user contact on an input surface of the user input apparatus, the second sensor 130 to measure orientation information that is input based on a physical quantity associated with a pose or a rotary motion of the user input apparatus, and the signal processing unit 150 to generate a content control signal by combining the contact information and the orientation information.

The contact information measured using the first sensor 110 may include at least one of information about whether a user contact with the user input apparatus, and changed contact coordinates (position).

The signal processing unit 150 may select a plane on a 3D space of content from the orientation information measured using the second sensor 130, and may generate new information in the 3D space by projecting the measured contact information onto the selected plane. The signal processing unit 150 may change an attribute associated with a translation or a rotation of the content using the selected plane and the new information in the 3D space.

Figure 4:
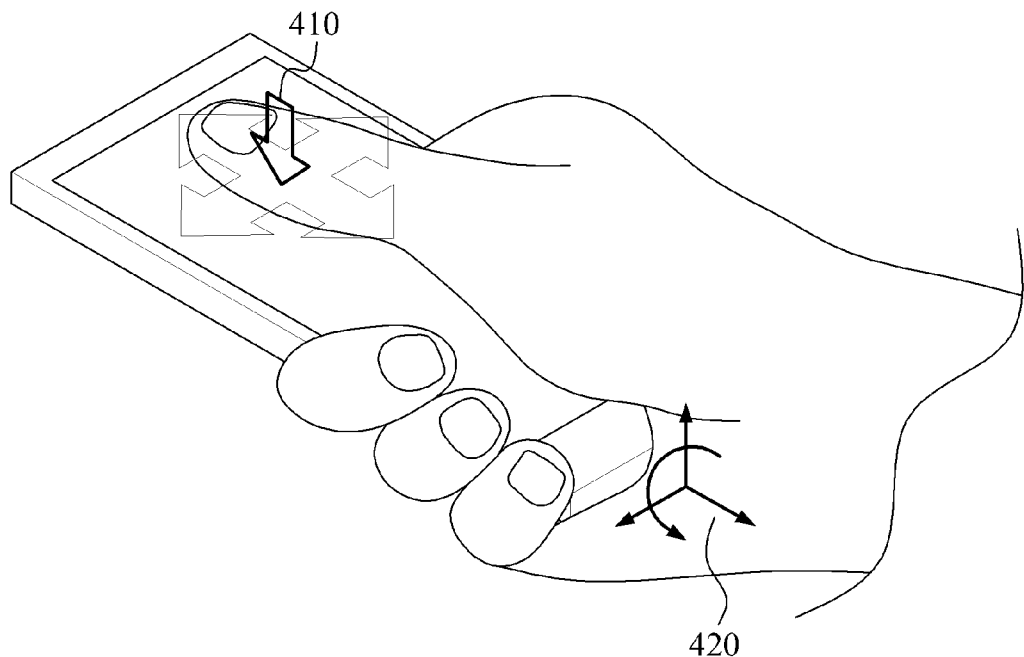
FIG. 4 illustrates an example of a user input apparatus using a contact motion according to an embodiment.

FIG. 4 illustrates an example of a user input apparatus using a contact motion according to an embodiment.

Referring to FIG. 4, the user input apparatus may include a first sensor 410 including a contact sensor to measure contact motion and to use the measured contact motion as an input, and a second sensor 420 to measure orientation information that is input based on a physical quantity associated with a pose or a rotary motion of the user input apparatus.

The first sensor 410 of the user input apparatus may include any type of sensor capable of sensing a contact on the user input apparatus or a change in contact coordinates (position). For example, the first sensor 410 may include any sensor capable of measuring a change value in a physical state such as resistance, capacitance, voltage, optical wavelength, and temperature, for example, and may include at least one sensor in which contact measurement elements are combined in an array form.

Hereinafter, a method of measuring contact information will be described based on the assumption that a contact sensor is used as a first sensor of a user input apparatus according to an embodiment.

A contact sensor that is a first sensor may be variously embodied based on a touchable area, a resolution, and a sensor type. The contact sensor may calculate information about contact coordinates (position), a movement direction of contact coordinates, and whether a predetermined gesture is input, for example. The contact sensor may also sense a contact level or a proximity level based on the sensor type.

For example, the contact sensor may calculate the movement direction of contact coordinates (position) from an output of the contact sensor and may directly use the calculated movement direction of contact coordinates, or may classify the movement direction of contact coordinates as a predetermined direction based on a calculated value and thereby use the same as contact information.

The force sensor may express the movement direction of contact coordinates using a unit such as a degree or a radian, and may calculate the movement direction of contact coordinates that is expressed using up/down/left/right, 4 compass bearings, 8 compass bearings, and 12-hour expression, for example. Also, the contact sensor may calculate, as contact information, a gesture with respect to a vertical direction, such as a light tap or a long tap, which is distinguishable from horizontal direction information.

As another example, the contact sensor may use, as contact information, a level of pushing based on a sensor type, and may calculate, from the output of the contact sensor, duration of time in which the contact is maintained, and calculate the calculated duration of time as contact information using magnitude of input. For example, the contact sensor may express the duration of time in which the contact is maintained using a physical unit indicating a time such as second, for example, and may calculate contact information that is expressed using a relative level such as short/long and levels 1 to 3.

The user input apparatus may generate a content control signal by combining the contact information that is measured using the first sensor 410 and the orientation information that is measured using the second sensor 420.

The user input apparatus may include the first sensor 110 to measure direction input information, the second sensor 130 to measure orientation information that is input based on a physical quantity associated with a pose or a rotary motion of the user input apparatus, and the signal processing unit 150 to generate a content control signal by combining the direction input information and the orientation information.

The first sensor 110 may include at least one unit key for inputting a predetermined direction, and may receive consecutive direction input information by the at least one unit key.

The signal processing unit 150 may select a plane on a 3D space of content from the orientation information, and may generate new information in the 3D space by projecting the direction input information onto the selected plane.

Figure 5:
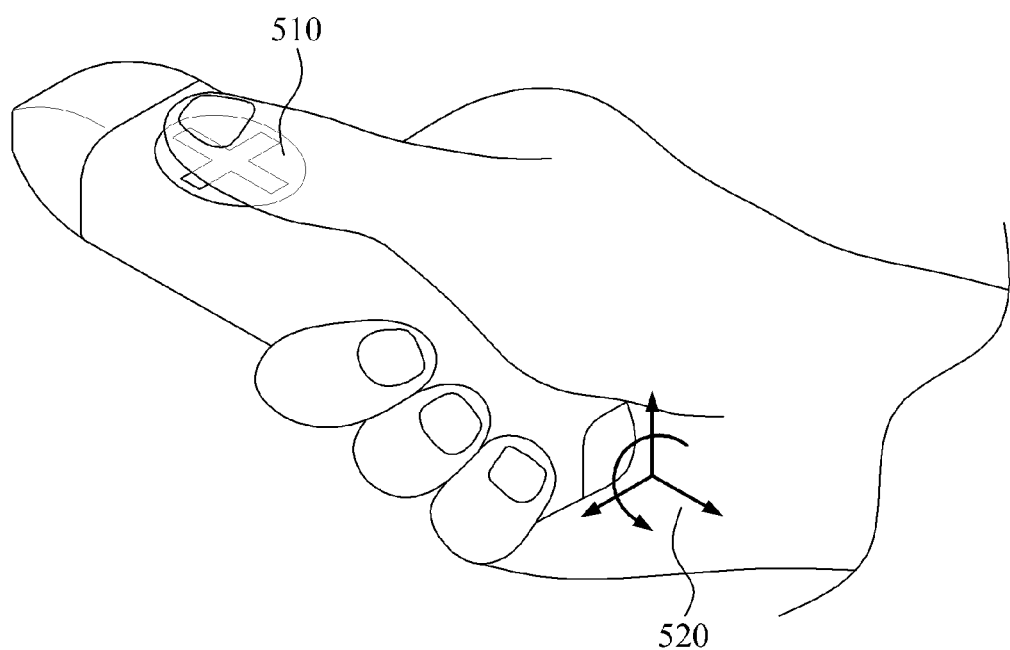
FIG. 5 illustrates an example of a user input apparatus using a direction key according to an embodiment.

FIG. 5 illustrates an example of a user input apparatus using a direction key according to an embodiment.

Referring to FIG. 5, the user input apparatus may include the direction key as a first sensor 510. In this example, the first sensor 510 may include any sensor capable of sensing a key manipulation of a direction key corresponding to received input information when the input information about a predetermined direction key, for example, a 4-direction key, an 8-direction key, or a direction key of a consecutive angle, is received.

Hereinafter, a method of measuring direction input information will be described based on the assumption that a direction key is used as a first sensor of a user input apparatus according to an embodiment.

A direction key of the first sensor 510 may be variously embodied based on the number of keys or buttons, arrangement thereof, and an input scheme thereof, for example. For example, the direction key may be configured so that the respective keys of various directions such as up/down/left/right may be distinguished and thereby be pushed to designate an input of a predetermined single direction. Alternatively, the direction key may be configured so that a single key may receive inputs of a plurality of directions and thus, may receive direction information based on a pushed position and a tilt angle of the body of the key in a state where the key is pushed. Also, in addition to an input with respect to a horizontal direction through the direction key, the first sensor 510 may receive an input that is applied in a vertical direction.

The user input apparatus may include the second sensor 520 to measure orientation information that is input based on a physical quantity associated with a pose or a rotary motion of the user input apparatus. The user input apparatus may generate a content control signal by combining the direction input information that is measured using the first sensor 510 and the orientation information that is measured using the second sensor 520.

Figure 6:
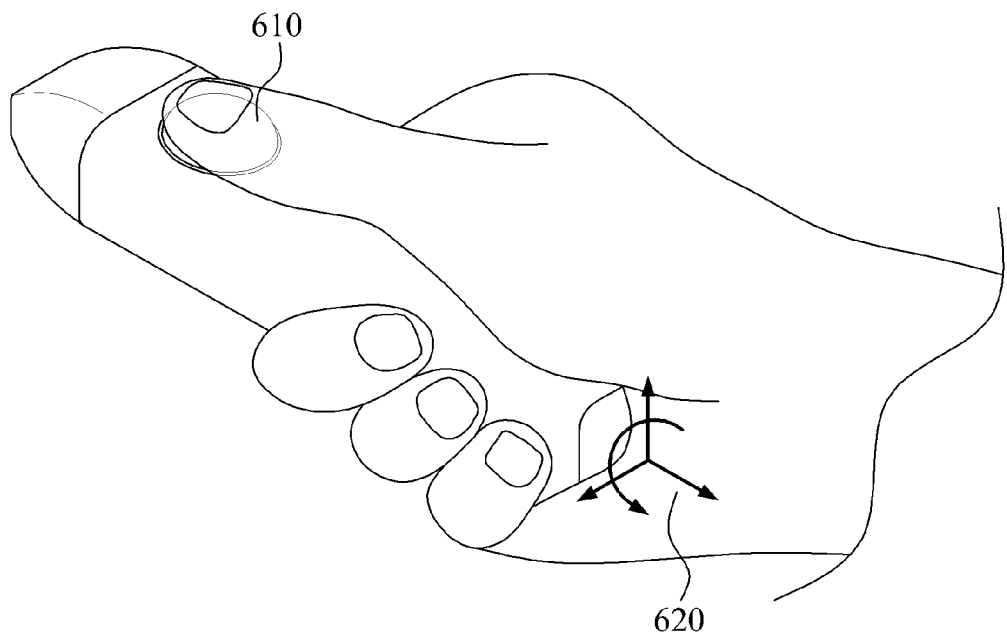
FIG. 6 illustrates an example of a user input apparatus using a ball according to an embodiment.

FIG. 6 illustrates an example of a user input apparatus using a ball according to an embodiment.

Referring to FIG. 6, the user input apparatus may apply, as a first sensor 610, a ball sensor that rolls, rotates, or revolves. The first sensor 610 may include any sensor capable of detecting a level of rotation by a rolling element. The first sensor 610 may measure a rotation level by measuring a change rate of an elastic body that confines the rolling element or by counting the number of times that the rolling element rotates.

The user input apparatus may include a second sensor 620 to measure orientation information that is input based on a physical quantity associated with a pose or a rotary motion of the user input apparatus. The user input apparatus may generate a content control signal by combining direction input information (a rotation level) that is measured using the first sensor 610 and the orientation information that is measured using the second sensor 620.

Figure 7:
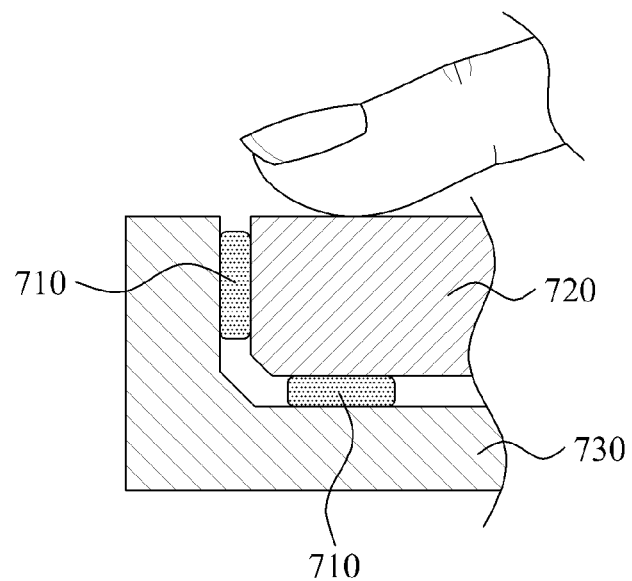
FIG. 7 illustrates a structure of a force sensor that is employed for a first sensor according to an embodiment.

FIG. 7 illustrates a structure of a force sensor that is employed for a first sensor according to an embodiment.

Referring to FIG. 7, the first sensor may include the force sensor, and may include a sensor 710 to measure force information of a user, a contact portion 720 on which the user contacts, and a supporter 730 to support the pressure transferred to the sensor 710.

Figure 8:
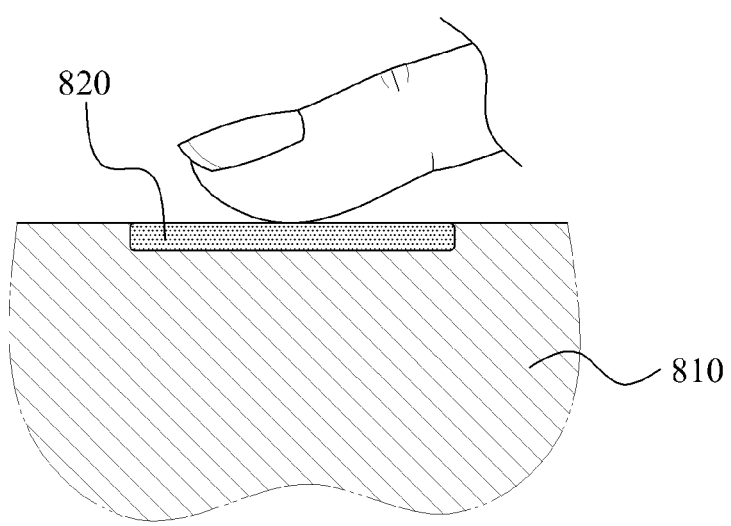
FIG. 8 illustrates a structure of a contact sensor that is employed for a first sensor according to an embodiment.

FIG. 8 illustrates a structure of a contact sensor that is employed for a first sensor according to an embodiment.

Referring to FIG. 8, the first sensor may include a contact sensor 820, and may be configured to detect an input on a contact surface such as artificial skin or a touch screen, for example, and be fixed by a supporter 810.

Figure 9:
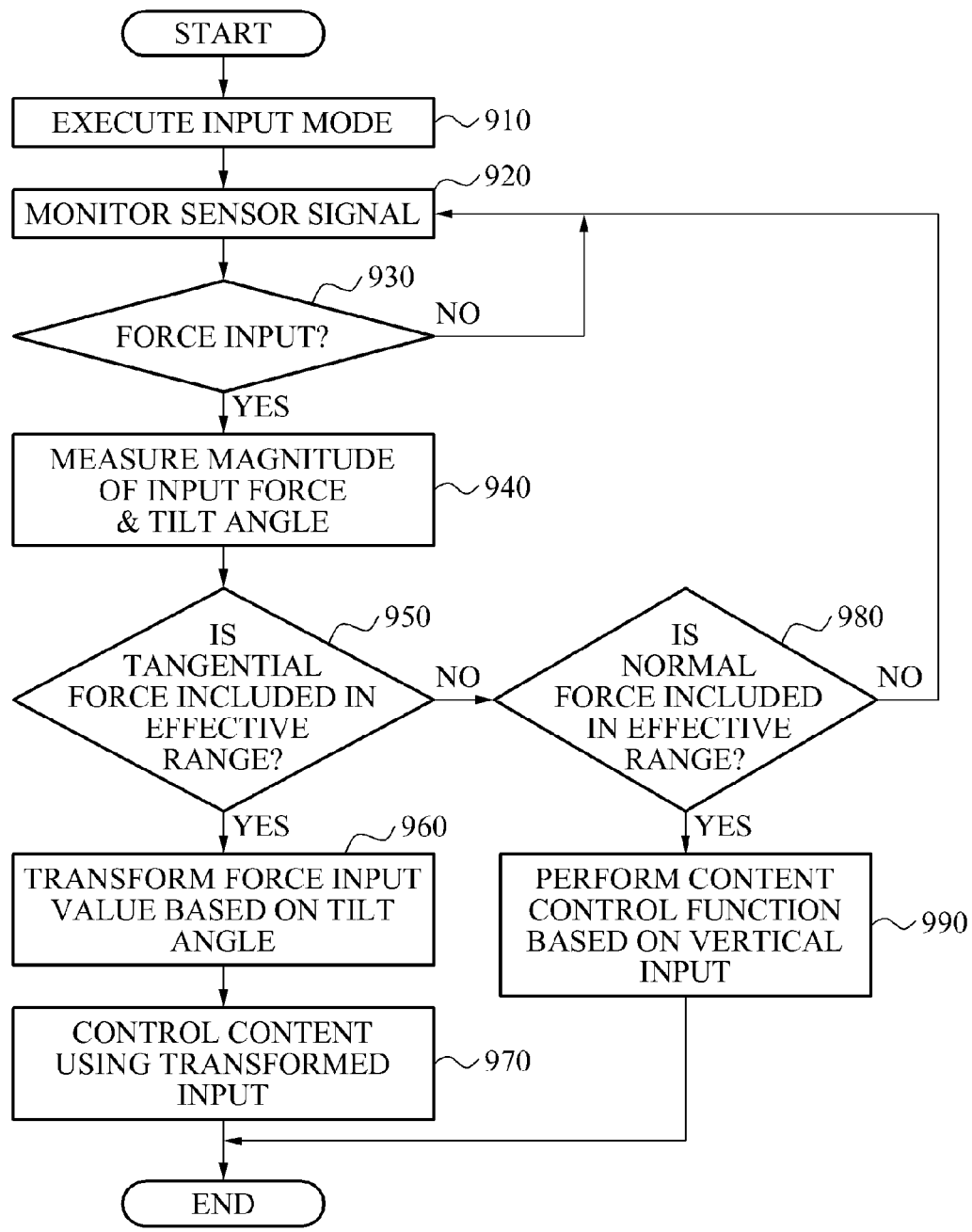
FIG. 9 illustrates a method of performing a content control function using a tangential force and an orientation according to an embodiment.

FIG. 9 illustrates a method of performing a content control function using a tangential force and an orientation according to an embodiment.

Referring to FIG. 9, a user input apparatus according to an embodiment may generate a content control signal using surface input information and orientation information, and may control content using the generated content control signal.

When an input mode is executed in operation 910, the user input apparatus may monitor a sensor signal in operation 920. In operation 930, the user input apparatus may determine whether a force is input. When it is determined that the force is input, the user input apparatus may measure a magnitude of the input force and a tilt angle in operation 940.

In operation 950, when it is determined that the force is input, the user input apparatus may determine whether a tangential force of the input force is within an effective range. When a magnitude of the tangential force is sufficiently large, for example, when a magnitude of the tangential force is within the effective range, the user input apparatus may transform a force input value to a 3D spatial vector input value through transformation based on the tilt angle. For example, the user input apparatus may transform the force input value based on tilt angle information in operation 960, and may control content using the transformed input in operation 970.

In operation 980, if it is determined that a tangential force of the input force is within an effective range, the user input apparatus may determine whether a normal force is within the effective range. When magnitude of the normal force is sufficiently large or an input is valid, the user input apparatus may perform a content control function based on the normal input in operation 990.

Figure 10:
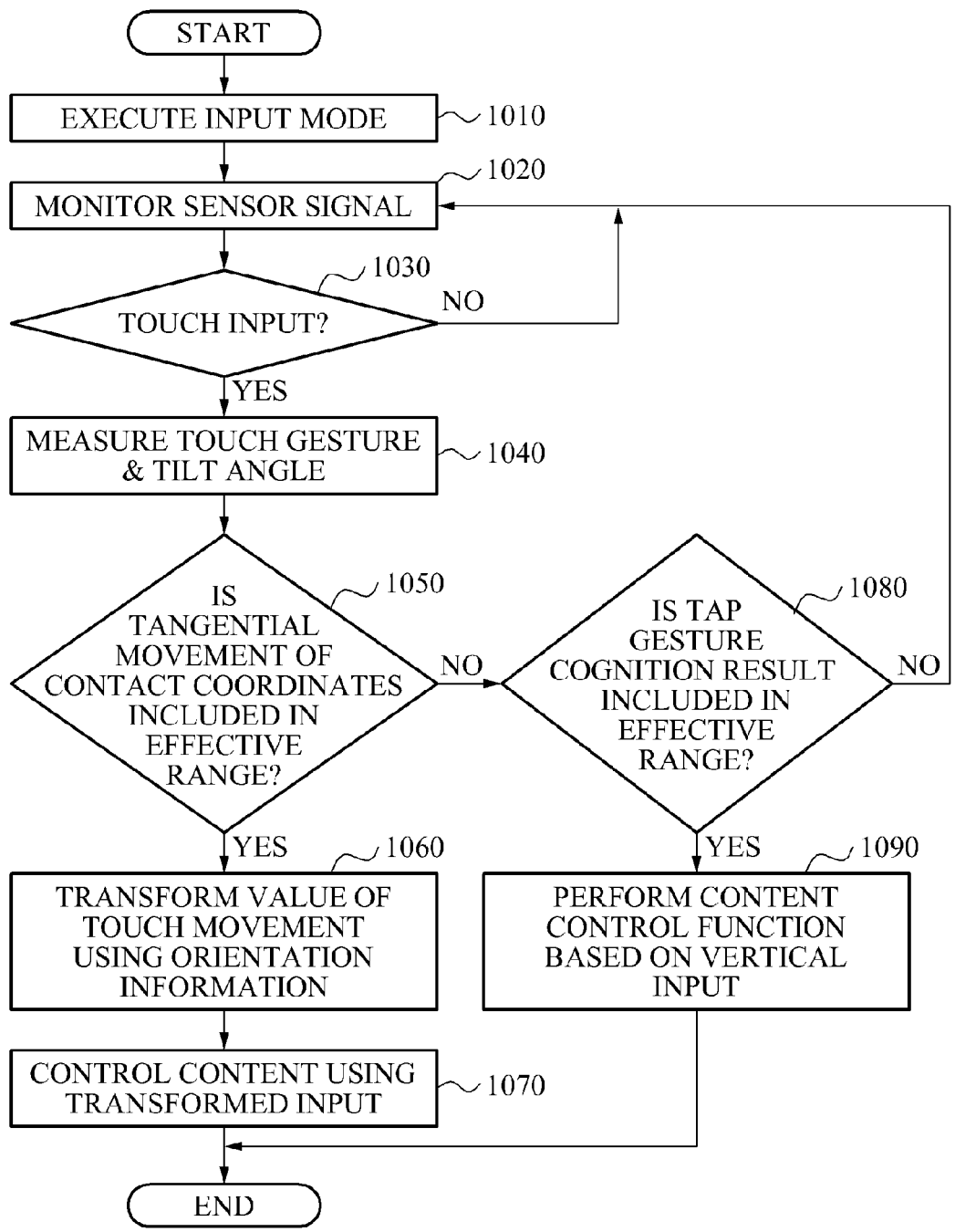
FIG. 10 illustrates a method of performing a content control function using a tangential movement of contact coordinates (position) and an orientation according to an embodiment.

FIG. 10 illustrates a method of performing a content control function using a tangential movement of contact coordinates and an orientation according to an embodiment.

Referring to FIG. 10, a user input apparatus according to an embodiment may generate a content control signal using surface input information and orientation information, and may control content using the generated content control signal.

When an input mode is executed in operation 1010, the user input apparatus may monitor a sensor signal in operation 1020. In operation 1030, the user input apparatus may determine whether a touch is input. When the touch is determined to be input, the user input apparatus may measure a touch gesture and a tilt angle in operation 1040.

In operation 1050, the user input apparatus may determine whether a tangential movement of contact coordinates is within an effective range. When the tangential movement is within the effective range, the user input apparatus may transform a value of touch movement using the orientation information in operation 1060, and may control content using the transformed input in operation 1070.

When the tangential movement is not within the effective range, the user input apparatus may determine that the input touch is a tap gesture. In operation 1080, the user input apparatus may determine whether a tap gesture recognition result is within the effective range. When the tap gesture recognition result is within the effective range, the user input apparatus may perform a content control function based on the normal input in operation 1090. Based on a predetermined input pattern, the user input apparatus may use the surface input information as an input value for a predetermined function such as select, cancel, or mode shift, for example.

The user input apparatus may generate an input using a 3D spatial vector and may also generate an input value by selecting a plane in a 3D virtual space using the measured orientation information and by projecting, onto the selected plane, a unit vector of input that is applied to the surface of the user input apparatus based on the surface input information.

For example, the user input apparatus may generate the input using the 3D spatial vector by transforming a 2D tangential input vector through a directional cosine transformation matrix including orientation information according to Equation 1:

$$\begin{bmatrix} V_x \\ V_y \\ V_z \end{bmatrix} = C(\theta) \begin{bmatrix} v_x \\ v_y \\ 0 \end{bmatrix}$$ [Equation 1]

In Equation 1, [v] denotes the 2D tangential input vector, $C(\theta)$ denotes transformation based on an Euler angle or quaternion, and [V] denotes the 3D spatial vector.

Figure 11:
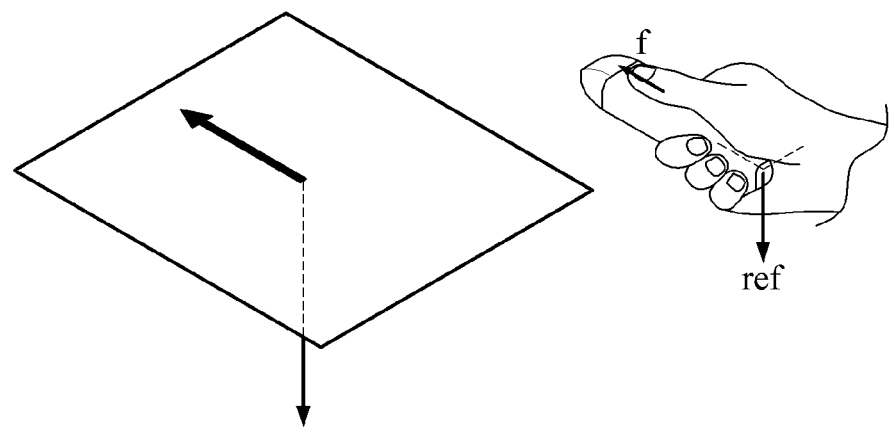
FIG. 11 and FIG. 12 illustrate an example of generating a three-dimensional (3D) input vector using surface input information and orientation information according to an embodiment.
Figure 12:
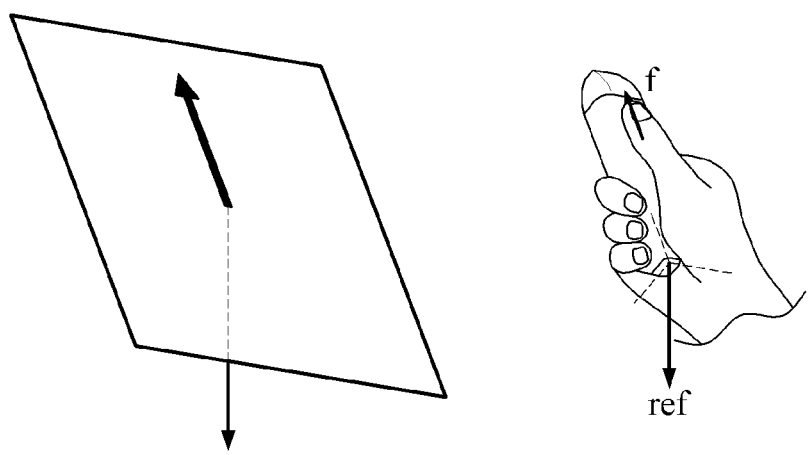

FIG. 11 and FIG. 12 illustrate an example of generating a 3D input vector using surface input information and orientation information according to an embodiment.

Referring to FIG. 11, when a device is posed in an orientation parallel to a plane on which a normal vector coincides with a reference vector (noted as "ref"), the pose may be measured using a second sensor. Next, the measured 2D input vector within the body coordinate by a first sensor may be projected onto the plane in a 3D space.

An indicator provided on the body may correspond to one of a direction of a force input f, movement of coordinates of a touch input, a direction input using a direction key, and a direction input using a roller or a ball.

Referring to FIG. 12, when a device is posed in an arbitrary orientation with respect to a plane on which a normal vector coincides with a reference vector (noted as "ref"), the pose may be measured using a second sensor. Next, the measured 2D input vector within the body coordinate by a first sensor may be projected onto the plane in a 3D space.

A tangential input vector measured by body coordinates may be expressed on the corresponding surface, and magnitude of force that is applied to the surface and measured in the horizontal direction may be mapped with vector magnitude on a virtual space on which 3D content is expressed. The above mapping relationship may be linear or nonlinear.

Figure 13:
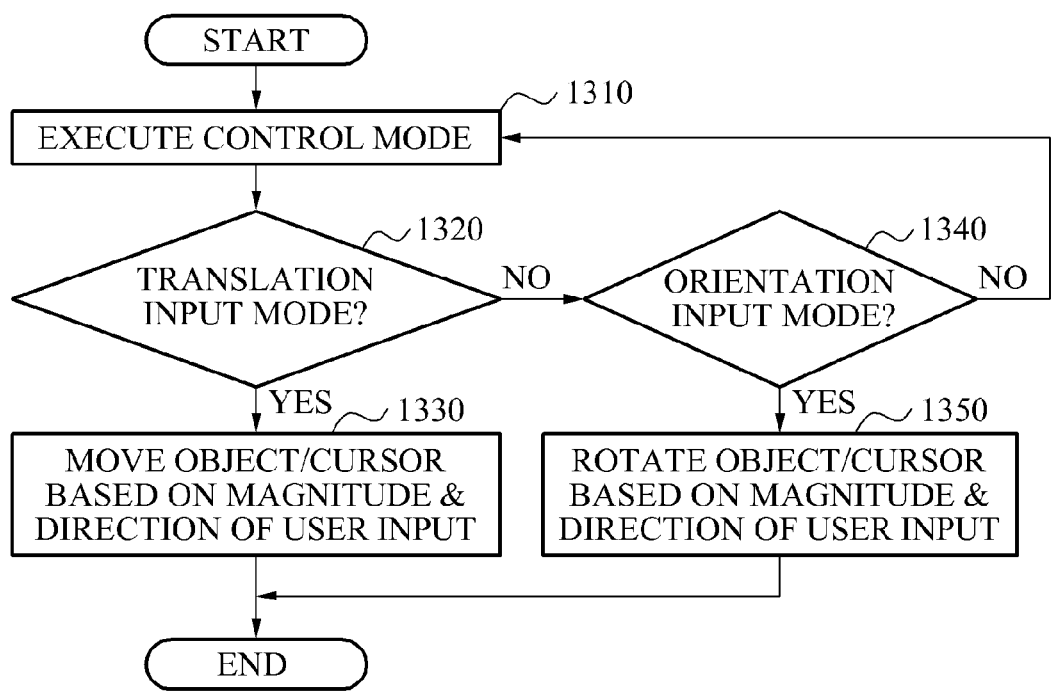
FIG. 13 illustrates a method of controlling an object or a cursor using surface input information and orientation information according to an embodiment.

FIG. 13 illustrates a method of controlling an object or a cursor using surface input information and orientation information according to an embodiment.

Referring to FIG. 13, when a control mode is executed in operation 1310, a user input apparatus according to an embodiment may determine whether the control mode corresponds to a translation input mode or an orientation input mode in operations 1320 and 1340.

In the case of the translation input mode, the user input apparatus may move an object and a cursor based on a magnitude and direction of the user input in operation 1330. In the case of the orientation input mode, the user input apparatus may rotate the object and the cursor based on the magnitude and direction of the user input in operation 1350.

Based on the control mode, a 3D input vector that is generated through the user input apparatus may be mapped with a physical quantity associated with a horizontal translation on a virtual space in which 3D content is expressed. For example, the physical quantity may include a position, velocity, acceleration, and the like. Also, the generated 3D input vector may be mapped with a physical quantity associated with a rotary motion. For example, the physical quantity may include an angular position, angular velocity, an angular acceleration vector, and the like.

Figure 14:
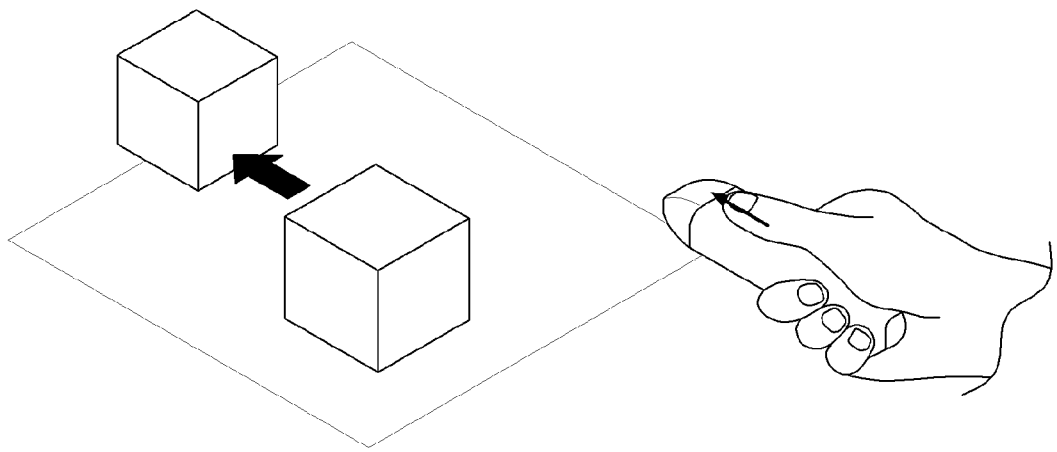
FIG. 14 through FIG. 16 illustrate an example of moving a cursor using surface input information and orientation information according to an embodiment.
Figure 15:
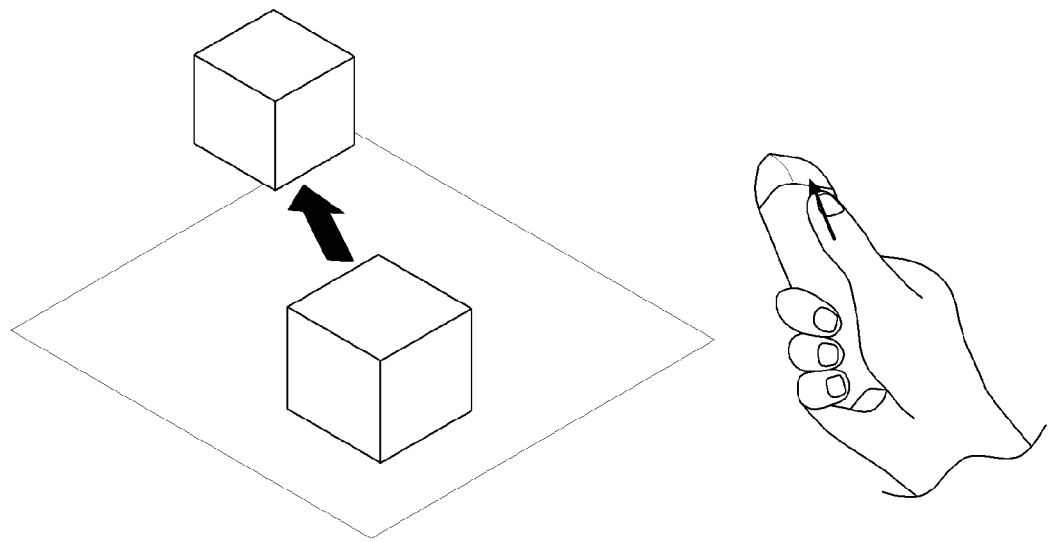
Figure 16:
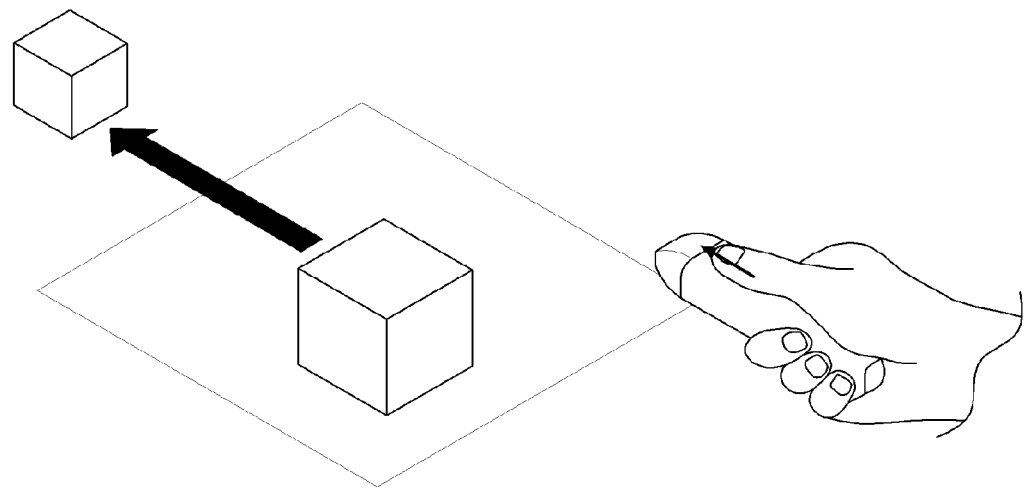

FIG. 14 through FIG. 16 illustrate an example of moving a cursor using surface input information and orientation information according to an embodiment.

Referring to FIG. 14 through FIG. 16, a user input apparatus according to an embodiment may use a 3D input vector, generated as an input value, as a value used to move coordinates of a 3D target, a cursor, or a camera.

Figure 17:
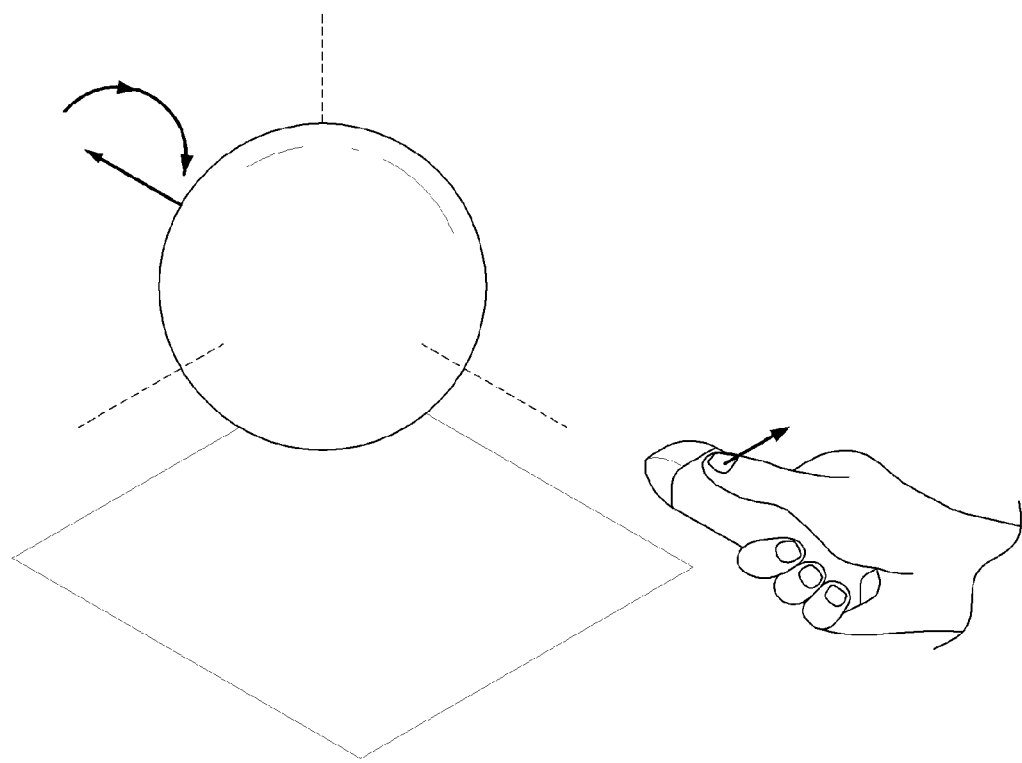
FIG. 17 and FIG. 18 illustrate an example of controlling rotation of an object using surface input information and orientation information according to an embodiment.
Figure 18:
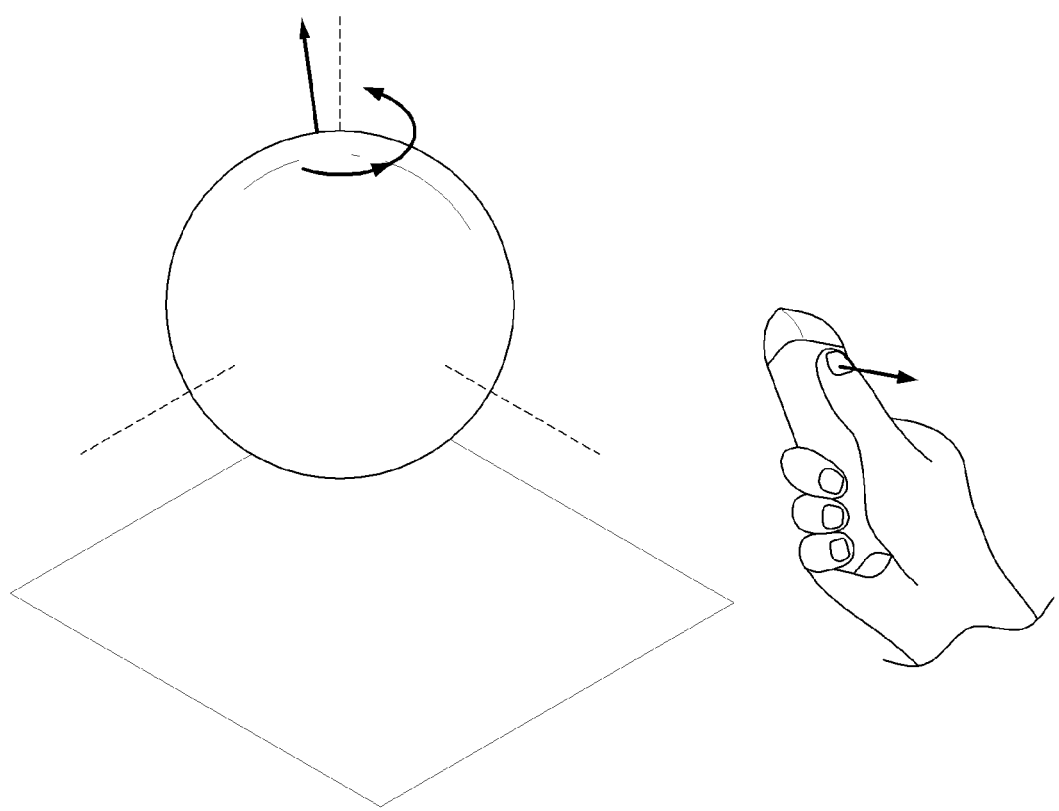

FIG. 17 and FIG. 18 illustrate an example of controlling rotation of an object using surface input information and orientation information according to an embodiment.

Referring to FIG. 17 and FIG. 18, a user input apparatus according to an embodiment may use a 3D input vector, generated as an input value, to change a rotation state of the object.

The user input apparatus may measure a magnitude and duration of time of an input from an input that is vertically applied to a user contact surface, and may control content using the measured value. Also, when the measured magnitude of force exceeds a predetermined threshold, the user input apparatus may perform the same functionality as a button, or may change a control value based on the magnitude of force.

The user input apparatus may perform a predetermined function by recognizing a duration of time in which the force is maintained or a consecutive input pattern of the force. For example, when vertical pressure beyond a predetermined effective range is measured, the user input apparatus may select an object at which a cursor is currently located.

The user input apparatus may modulate magnitude of a velocity vector at which the object moves using the vertical pressure, and may express the modulation by changing a color, a size, and the like of the cursor. Also, when a short force is consecutively applied to the vertical direction twice, the user input apparatus may shift a mode from a navigation mode to a system menu selection mode. On the contrary, the user input apparatus may shift a mode from the system menu selection mode to the navigation mode.

The user input apparatus may detect a direction, magnitude, and duration of time of force using a contact sensor and may also detect a point at which the force is acting.

The user input apparatus may generate a content control signal based on surface input information and orientation information, and may provide a feedback in response to control of 3D content using the content control signal.

The user input apparatus may provide at least one of an audio feedback, a haptic feedback, and a visual feedback to the user.

For example, when the user input apparatus moves or rotates the object in response to a user input, the user input apparatus may provide an effect such as inertia, viscosity, elasticity, color, temperature, roughness, friction, warping, brokenness, fragileness, and bending, for example, based on an attribute of the object or a virtual space in which the object is displayed. Also, the user input apparatus may configure the aforementioned feedback implementation as a graphical element and may also configure the above feedback effect as a predetermined tone or pitch sound. Also, the user input apparatus may express the feedback effect using force, distribution of pressure, vibration, flow of vibration, and the like.

Also, the user input apparatus may provide a tactile feedback to the user by including an electrostatic force actuator or a Peltier heat pump. For example, using the aforementioned module such as the electrostatic force actuator, the user input apparatus may provide the user with a tactile feedback in a portion in which a force of the user input apparatus is input. Using the aforementioned module such as the Peltier heat pump, the user input apparatus may provide the user with a tactile feedback about cold/warm temperature.

As an example, if a user controls an airplane object flying in a 3D space using the user input apparatus, when the airplane object makes contact with the sea in the 3D space according to control of the airplane object, the user input apparatus may provide the user with a haptic feedback of a cold sensation occurring due to the above contact. When the airplane object lands at the runway, the user input apparatus may provide the user with a sensation of contact by the landing such as a sensation of pressing a button, collision, and vibration, for example.

Figure 19:
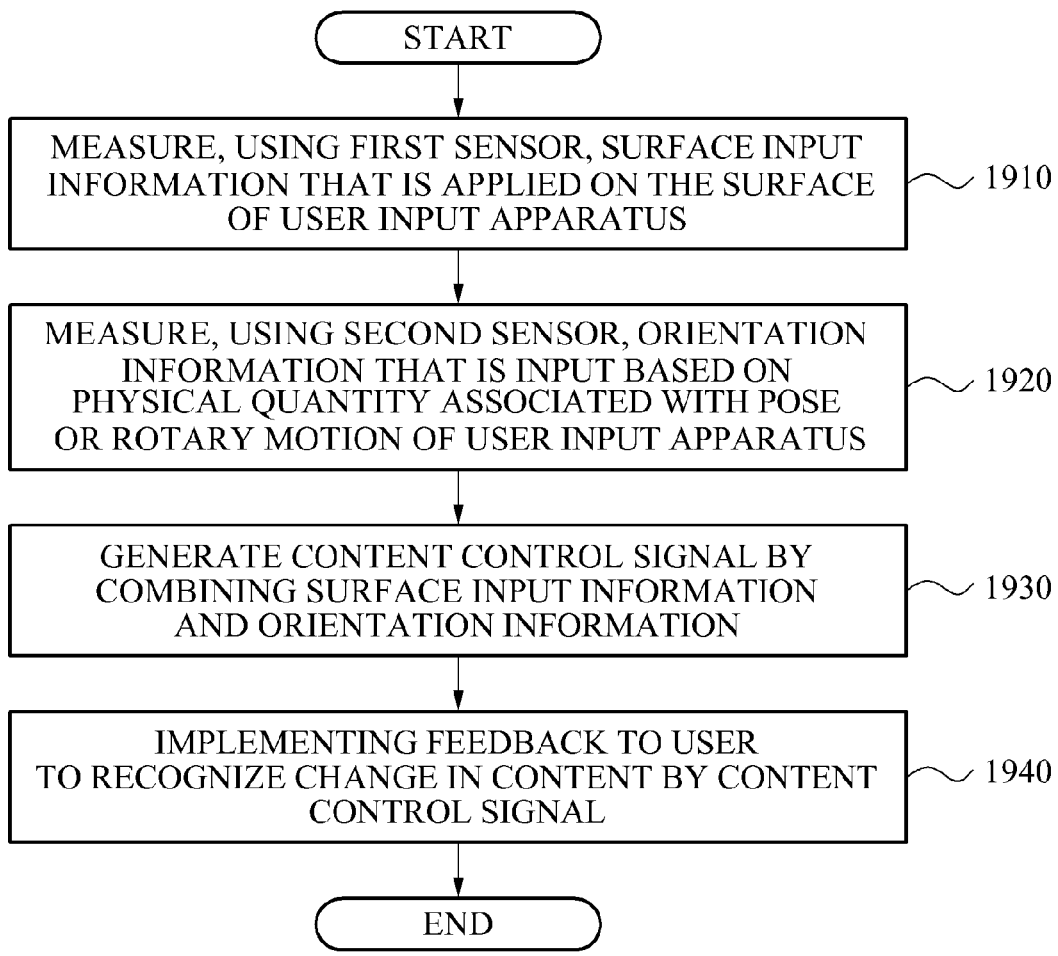
FIG. 19 illustrates a user input method according to an embodiment.

FIG. 19 illustrates a user input method according to an embodiment.

Referring to FIG. 19, in operation 1910, a user input apparatus according to an embodiment may measure, using a first sensor, surface input information that is applied to the surface of the user input apparatus. In operation 1920, the user input apparatus may measure, using a second sensor, orientation information that is input based on a physical quantity associated with a pose or a rotary motion of the user input apparatus.

In operation 1930, the user input apparatus may generate a content control signal by combining the measured surface input information and orientation information. In operation 1940, the user input apparatus may provide a feedback to a user to indicate a change in content by the generated content control signal.

Figure 20:
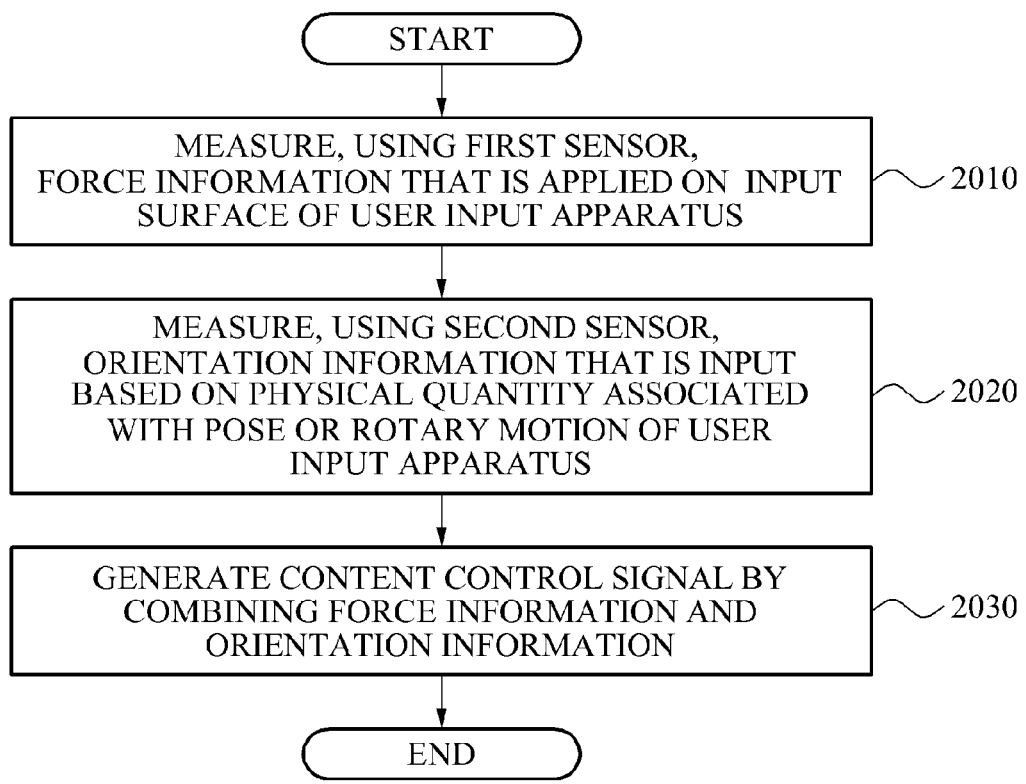
FIG. 20 illustrates a user input method according to an embodiment.

FIG. 20 illustrates a user input method according to an embodiment.

Referring to FIG. 20, in operation 2010, a user input apparatus according to an embodiment may measure, using a first sensor, force information that is applied to an input surface of the user input apparatus. In operation 2020, the user input apparatus may measure, using a second sensor, orientation information that is input based on a physical quantity of a pose or a rotary motion of the user input apparatus.

In operation 2030, the user input apparatus may generate a content control signal by combining the measured force information and orientation information.

Figure 21:
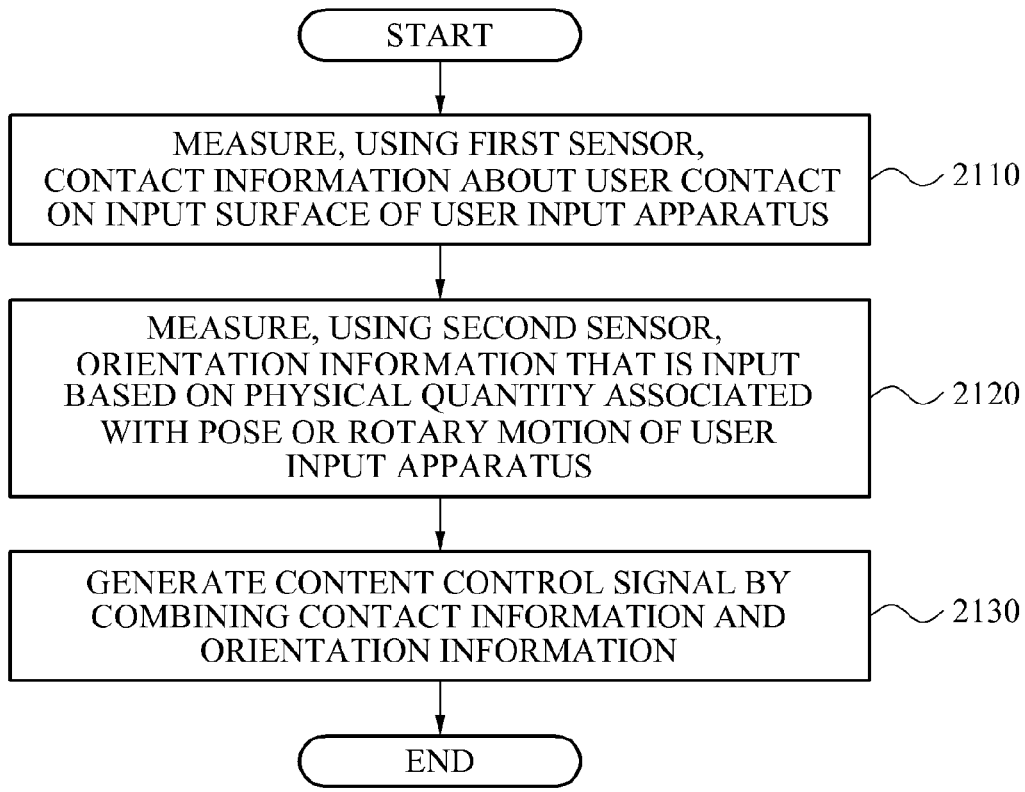
FIG. 21 illustrates a user input method according to an embodiment.

FIG. 21 illustrates a user input method according to an embodiment.

Referring to FIG. 21, in operation 2110, a user input apparatus according to an embodiment may measure, using a first sensor, contact information about a user contact on an input surface of the user input apparatus. In operation 2120, the user input apparatus may measure, using a second sensor, orientation information that is input based on a physical quantity associated with a pose or a rotary motion of the user input apparatus.

In operation 2130, the user input apparatus may generate a content control signal by combining the measured contact information and orientation information.

Figure 22:
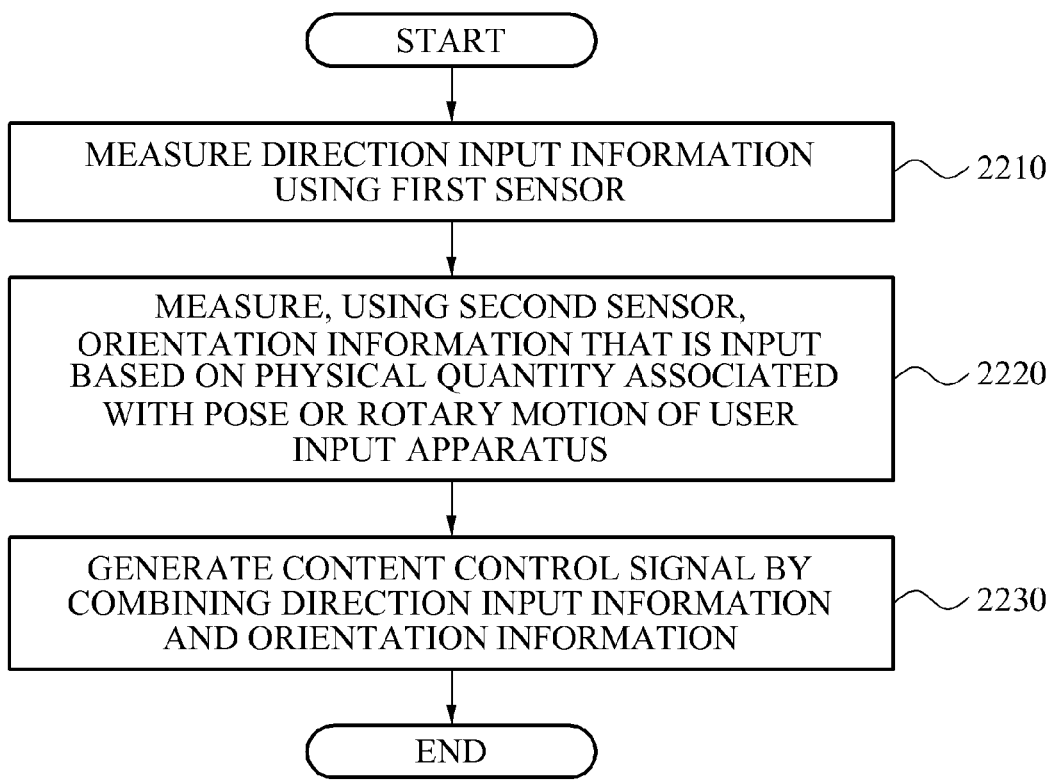
FIG. 22 illustrates a user input method according to an embodiment.

FIG. 22 illustrates a user input method according to an embodiment.

Referring to FIG. 22, in operation 2210, a user input apparatus may measure direction input information using a first sensor. In operation 2220, the user input apparatus may measure, using a second sensor, orientation information that is input based on a physical quantity associated with a pose or a rotary motion of the user input apparatus.

In operation 2230, the user input apparatus may generate a content control signal by combining the measured direction input information and orientation information. For example, according to the aforementioned user input method, the user input apparatus may measure a 2D input that is applied by the user to the user input apparatus and a tilt angle of the user input apparatus, and may use the measured values as 3D input information.

A user input apparatus according to embodiments may embody various user inputs through combination with an existing user input apparatus.

A user input apparatus according to embodiments may measure magnitude and a direction of a surface input that is applied by the user to an apparatus and may also measure an orientation of the apparatus using an orientation sensor in the user input apparatus. Accordingly, without using both hands or without using a supporting structure, the user input apparatus may measure input information for controlling 3D content.

A user input apparatus according to embodiments may control content displayed on a 3D display unit by employing a surface input applied to an apparatus and orientation information of the user input apparatus. Accordingly, the user input apparatus enables an intuitive and convenient user input.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A user input apparatus, comprising:
    a first sensor configured to measure force information that is applied to an input surface of the user input apparatus, wherein the force information comprises vertical information in a direction normal to the surface, horizontal information in a direction parallel to the surface, or a combination thereof;
    a second sensor configured to measure orientation information that includes a physical quantity of a rotary motion of the user input apparatus, the second sensor including an angular velocity detector, a tilt sensor, a magnetic field sensor, an azimuth sensor, a gravity sensor, or a combination thereof; and
    a signal processing unit configured to generate a content control signal by combining the force information and the orientation information,
    wherein the signal processing unit is configured to:
    calculate a magnitude of a force based on the measured force information,
    calculate a tilt angle of the user input apparatus based on the measured orientation information, and
    generate a 3D input information using transform of the force information based on the tilt angle, when the magnitude of the force is greater than or equal to a predetermined value.

2. The apparatus of claim 1, further comprising:
    a detector configured to detect a position of a point of action of force at which the force information is input.

3. The apparatus of claim 1, wherein the signal processing unit is configured to:
    select a plane on a three-dimensional (3D) space of content from the orientation information; and
    generate new information in the 3D space by projecting the force information onto the selected plane.

4. The apparatus of claim 3, wherein the signal processing unit is configured to:
    change an attribute associated with a translation or a rotation of the content, using the selected plane and the new information in the 3D space.

5. A user input method, comprising:
    measuring, using a first sensor, force information that is applied to an input surface of a user input apparatus, wherein the force information comprises vertical information in a direction normal to the surface, horizontal information in a direction parallel to the surface, or a combination thereof;
    measuring, using a second sensor, orientation information that includes a physical quantity of a rotary motion of the user input apparatus, the second sensor including an angular velocity detector, a tilt sensor, a magnetic field sensor, an azimuth sensor, a gravity sensor, or a combination thereof; and
    generating a content control signal by combining the force information and the orientation information,
    wherein the generating comprises:
    calculating a magnitude of a force based on the measured force information,
    calculating a tilt angle of the user input apparatus based on the measured orientation information, and
    generating a 3D input information using transform of the force information based on the tilt angle, when the magnitude of the force is greater than or equal to a predetermined value.

6. A non-transitory computer-readable medium comprising a program for instructing a computer to perform the method of claim 5.

7. The method of claim 5, wherein:
    the measuring of the force information comprises
        measuring a magnitude of an input force that is applied to the input surface;
    the measuring of the orientation information comprises
        measuring a tilt angle of the user input apparatus; and
    the method further comprises
        transforming the magnitude of the input force based on the tilt angle, and control content based on the transformed magnitude of the input force, in response to a magnitude of a tangential force of the input force being in a predetermined range; and
        controlling content based on the magnitude of the input force in response to the magnitude of the tangential force not being in the predetermined range and a magnitude of a normal force of the input force being in the predetermined range.

* * * * *